United States Patent
Lee et al.

(10) Patent No.: US 8,142,954 B2
(45) Date of Patent: Mar. 27, 2012

(54) FUEL COMPOSITION FOR FUEL CELL AND FUEL CELL USING THE SAME

(75) Inventors: Seol-ah Lee, Yongin-si (KR); Hyuk Chang, Seongnam-si (KR); Chan-ho Pak, Seoul (KR); Dae-jong Yoo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 1226 days.

(21) Appl. No.: 11/585,211

(22) Filed: Oct. 24, 2006

(65) Prior Publication Data

US 2007/0122665 A1    May 31, 2007

(30) Foreign Application Priority Data

Nov. 25, 2005   (KR) .................. 10-2005-0113495

(51) Int. Cl.
*H01M 8/22* (2006.01)
*C10L 1/18* (2006.01)

(52) U.S. Cl. ........... 429/502; 429/505; 429/506; 44/436

(58) Field of Classification Search .............. 44/436; 429/502, 505, 506
See application file for complete search history.

(56) References Cited

U.S. PATENT DOCUMENTS

| | | | | |
|---|---|---|---|---|
| 4,386,938 A | * | 6/1983 | Earle | 44/322 |
| 4,698,965 A | * | 10/1987 | Delchev et al. | 60/227 |
| 5,906,664 A | * | 5/1999 | Basu et al. | 44/446 |
| 5,951,722 A | * | 9/1999 | Sanders et al. | 44/354 |
| 6,410,175 B1 | * | 6/2002 | Tillmetz et al. | 429/424 |
| 2005/0034357 A1 | * | 2/2005 | Nemeth et al. | 44/265 |
| 2005/0066662 A1 | * | 3/2005 | Cronce | 60/721 |

FOREIGN PATENT DOCUMENTS

| | | | |
|---|---|---|---|
| CN | 1082096 | * | 2/1994 |
| CN | 1097456 | * | 1/1995 |
| CN | 1703791 | | 11/2005 |
| JP | 2000-021426 | | 1/2000 |
| JP | 2001-226102 | * | 8/2001 |
| JP | 2002-343403 | | 11/2002 |
| JP | 2004-006335 | | 1/2004 |
| JP | 2004-006335 | * | 8/2004 |
| JP | 2007-066814 | | 3/2007 |
| WO | WO 2005075342 A1 | * | 8/2005 |

OTHER PUBLICATIONS

H. Zhao, J. Shen, J. Zhang, H. Wang, D. P. Wilkinson, C. E. Gu. Liquid methanol concentration sensors for direct methanol fuel cells, J. Power Sources 2006, 159, 626-636.*

Certificate of Patent No. ZL 200610148650 issued in the corresponding Chinese application on Jan. 6, 2010.

(Continued)

*Primary Examiner* — Jerry Lorengo
*Assistant Examiner* — Carlos Barcena
(74) *Attorney, Agent, or Firm* — Christie, Parker & Hale, LLP

(57) ABSTRACT

A fuel composition for a fuel cell includes at least one primary fuel that produces protons and electrons, and at least one peroxide. As an example, the primary fuel may be at least one aqueous solution containing methanol, ethanol, or formic acid. When the fuel composition is used, the catalytic activity can increase, and thus a fuel cell having improved performance can be manufactured.

7 Claims, 1 Drawing Sheet

OTHER PUBLICATIONS

Japanese Office action dated Aug. 10, 2010, for corresponding Japanese Patent application 2006-318727, noting listed references in this IDS.

Japanese Office action dated Aug. 10, 2010, for corresponding Japanese Patent application 2006-318727, and English translation.

* cited by examiner

FUEL COMPOSITION FOR FUEL CELL AND FUEL CELL USING THE SAME

CROSS-REFERENCE TO RELATED APPLICATION

This application claims the benefit of Korean Patent Application No. 2005-113495, filed on Nov. 25, 2005, in the Korean Intellectual Property Office, the disclosure of which is incorporated herein in its entirety by reference.

BACKGROUND OF THE INVENTION

1. Field of the Invention

Aspects of the present invention relate to a fuel composition for a fuel cell and a fuel cell using the same. More particularly, aspects of the present invention relate to a fuel composition containing additives that increase catalytic activity so as to maximize the performance of a fuel cell and a fuel cell using the same.

2. Description of the Related Art

Methanol in direct methanol fuel cells (DMFCs) is adsorbed by an anode catalyst and reacts as indicated by Reaction Scheme 1 below to produce electrons, protons, and carbon monoxide.

[Reaction Scheme 1]

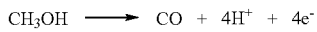

$$CH_3OH \longrightarrow CO + 4H^+ + 4e^-$$

The carbon monoxide produced through this reaction can attach to the anode catalyst and cause the area of the catalyst where oxidation occurs to decrease, thereby reducing the power output of the fuel cell. To overcome this problem, a method of using an anode catalyst that promotes additional oxidation of CO and a method of using a mixture of methanol and an aqueous liquid electrolyte as a fuel have been suggested. According to such methods, methanol reacts with water at the anode as indicated by Reaction Scheme 2 to produce carbon dioxide, electrons and protons.

[Reaction Scheme 2]

$$CH_3OH + H_2O \longrightarrow 6H^+ + CO_2 + 6e^-$$

In DMFCs, a solid polymer electrolyte membrane is used as an electrolyte membrane. The solid polymer electrolyte membrane may be a perfluorocarbon membrane such as a Nafion® membrane. However, when such a solid polymer electrolyte membrane is used, methanol diffuses through the electrolyte membrane, and thus, a large amount of methanol for generating electricity cannot be used and is lost by evaporation. Also, when methanol contacts the cathode catalyst, the methanol is directly oxidized on the cathode and generates heat instead of electricity, thereby reducing the amount of current generated. Moreover, protons generated at the anode catalyst layer cannot smoothly move to the cathode catalyst layer by passing through the solid polymer electrolyte membrane, thereby reducing the amount of current generated.

In order to overcome these problems, it has been suggested to actively produce hydroxide ions (OH⁻) in a DMFC or in a fuel cell that uses $NaBH_4$ as fuel by including a compound such as $Na_2S_2O_3$, $Na_2HPO_3$, or $Na_2HPO_2$ in the fuel cell (U.S. Pat. No. 6,773,470).

However, the performance of such a fuel cell has not yet reached a satisfactory level, and, thus, there is much to be improved.

SUMMARY OF THE INVENTION

Aspects of the present invention provide a fuel composition that can increase catalytic activity to improve the performance of a fuel cell.

Aspects of the present invention also provide a fuel cell having improved efficiency using the fuel composition.

According to an aspect of the present invention, there is provided a fuel composition for a fuel cell including at least one primary fuel that produces protons and electrons, and at least one peroxide.

According to another aspect of the present invention, there is provided a fuel cell including a cathode, an anode, an electrolyte membrane disposed between the cathode and the anode, and the fuel composition.

According to another aspect of the present invention, there is provided a method of operating a fuel cell that comprises a cathode, an anode and an electrolyte membrane disposed between the cathode and the anode, the method comprising: supplying the anode of the fuel cell with a fuel composition comprising at least one primary fuel that produces protons and electrons and at least one peroxide.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
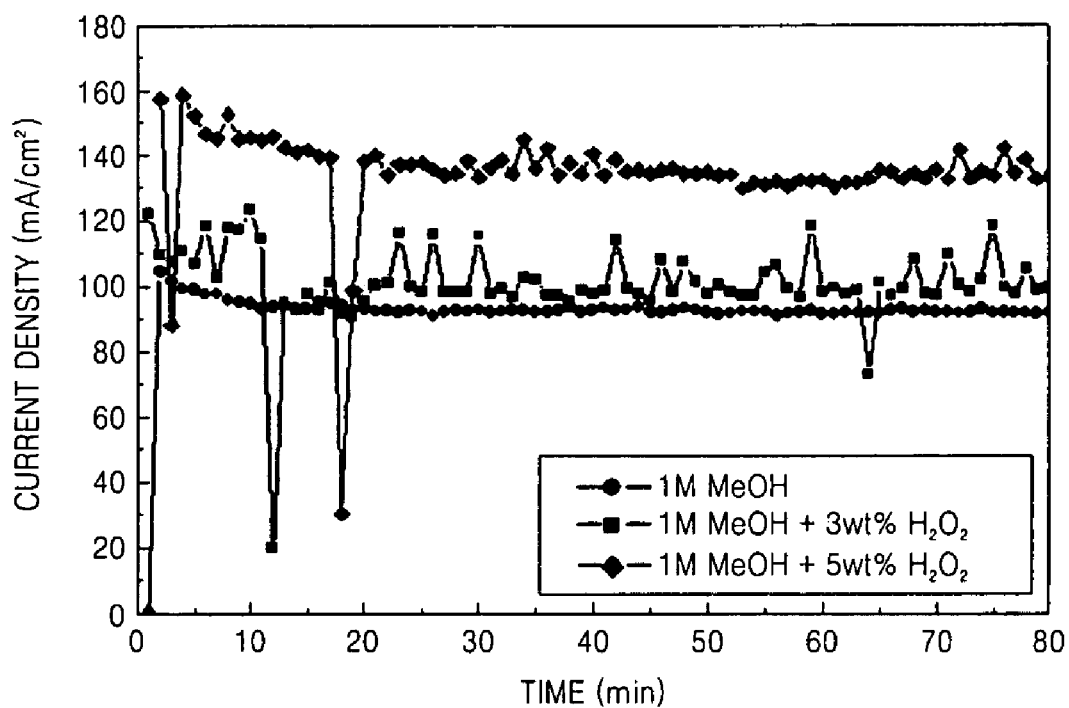
FIG. 1 is a graph of current density versus time for fuel cells manufactured according to Examples 1 and 2 and Comparative Example 1.

Reference will now be made in detail to the present embodiments of the present invention, examples of which are illustrated in the accompanying drawings, wherein like reference numerals refer to the like elements throughout. The embodiments are described below in order to explain aspects of the present invention by referring to the figures.

A fuel composition according to an embodiment of the present invention is formed of at least one primary fuel that produces protons and electrons, and at least one peroxide.

The peroxide may be at least one peroxide selected from the group consisting of a compound represented by Formula 1, a compound represented by Formula 2, a compound represented by Formula 3 and sodium hydrogen peroxide.

$M^I_2O_2$           [Formula 1]

where $M^I$ is H, Li, Na, K, $NH_4$, Rb, or Cs,

$M^{II}O_2$           [Formula 2]

where $M^{II}$ is Mg, Ca, Sr, Ba, Zn, Cd, or Hg,

R—O—O—R           [Formula 3]

where R is an acetyl group or a C1-C20 alkyl group.

In particular, the peroxide may be hydrogen peroxide. The hydrogen peroxide may be used in the form of an aqueous hydrogen peroxide solution. In an aqueous solution, the concentration of the hydrogen peroxide may be 0.01 to 50% by weight.

The amount of the peroxide may be 0.01 to 99% by weight of the fuel composition, and, as a specific example, may be 0.1 to 50% by weight. When the amount of the peroxide is less than 0.01% by weight, the amount of the peroxide is small, and thus the quantity of hydrogen ions generated is small. When the amount of the peroxide is greater than 99% by weight, the amount of the primary fuel is relatively small, and thus, the quantity of electrons generated is small.

The primary fuel produces protons and electrons. As an example, the primary fuel may include at least one aqueous solution selected from the group consisting of an aqueous solution of at least one C1-C10 alkyl alcohol and an aqueous solution of at least one C1-C10 alkyl acid. Non-limiting, specific examples of a C1-C10 alkyl alcohol are methanol and ethanol. A non-limiting, specific example of a C1-C10 alkyl acid is formic acid. As an example, the concentration of the C1-C10 alkyl alcohol or C1-C10 alkyl acid in the aqueous solution may be 0.01 M to 17 M. When the concentration of the C1-C10 alkyl alcohol or C1-C10 alkyl acid in the aqueous solution is less than 0.01 M, the quantity of electrons generated is small. When the concentration of the C1-C10 alkyl alcohol or C1-C10 alkyl acid in the aqueous solution is greater than 17 M, poisoning of the anode catalyst by carbon monoxide may occur, and the amount of C1-C10 alkyl alcohol or C1-C10 alkyl acid (such as, for example, methanol) that passes through the polymer electrolyte may increase, causing a decline in the performance of the fuel cell.

Without being bound to any particular theory, the operating principle of a fuel cell using the fuel composition containing hydrogen peroxide according to an embodiment of the present invention may be described as follows.

The hydrogen peroxide contained in the fuel composition can react or decompose as indicated by Reaction Scheme 3 or Reaction Scheme 4 below.

[Reaction Scheme 3]

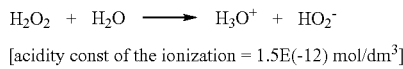

[acidity const of the ionization = 1.5E(-12) mol/dm$^3$]

[Reaction Scheme 4]

Referring to Reaction Scheme 3, hydrogen peroxide is basically neutral but can be used as a strong oxidizer. The reaction product thereof can act as a proton conductor. When hydrogen peroxide as an anode fuel reacts as in Reaction Scheme 3, the hydrogen peroxide facilitates the movement of protons included in the anode catalyst layer, which increases the reaction speed. Consequently, the utilization efficiency of the catalyst increases, thereby increasing the performance of the fuel cell.

Referring to Reaction Scheme 4, hydrogen peroxide is easily oxidized in the presence of a metallic catalyst, and thus, may decompose into water and oxygen. Oxygen, which is a by-product, flows out of the fuel cell with unreacted methanol and carbon dioxide. When the amount of oxygen is small, this does not affect the performance of a fuel cell.

When the amount of the oxygen generated according to Reaction Scheme 4 is large, the performance of the fuel cell is degraded. Therefore, if an oxygen-removing film such as a gas-impermeable film is used, the effect of the hydrogen peroxide can be improved.

A fuel cell according to an embodiment of the present invention will now be described in detail.

A fuel cell according to an embodiment of the present invention includes a cathode, an anode, an electrolyte membrane disposed between the cathode and the anode and a fuel composition as described above. As an example, the fuel cell may comprise anode and cathode electrodes having catalyst layers on reverse sides of a polymer electrolyte membrane, the catalyst layers being bonded to the polymer electrolyte membrane at a high temperature and pressure. As another example, the fuel cell may include a structure in which a metallic catalyst that catalyzes an electrochemical reaction is coated on a polymer electrolyte membrane, and a fuel diffusion layer is bound to the metallic catalyst. As another example, the fuel cell may include a catalyst layer formed directly on a fuel diffusion layer, and the fuel diffusion layer may be bonded to a polymer electrolyte membrane at a high temperature and pressure.

As non-limiting examples, the catalyst may be platinum (Pt), Pt/C, platinum alloy including platinum and at least one metal selected from the group consisting of gold, palladium, rhodium, iridium, ruthenium, tin, molybdenum, tungsten, iron, vanadium, copper, nickel, osmium, and chrome, or a catalyst in which the platinum alloy is dispersed on a carbon support.

As a specific, non-limiting example, the fuel cell may be a direct methanol fuel cell (DMFC). The structure and manufacturing method of such a fuel cell are not particularly restricted, and since detailed examples are disclosed elsewhere, a description is not included herein.

Aspects of the present invention will be described in greater detail with reference to the following examples. The following examples are for illustrative purposes only, and are not intended to limit the scope of the present invention.

EXAMPLE 1

In order to prepare a 1 M aqueous methanol solution and a 3% by weight hydrogen peroxide solution, 32 g of methanol, 100 g of a 30 wt % aqueous hydrogen peroxide solution, and ultra-pure distilled water were mixed to form a 1 liter mixed solution as a fuel composition. In the fuel composition, the weight ratio of methanol to hydrogen peroxide to ultra-pure distilled water was 3.20:3.00:93.8.

Pt/C was dispersed in a solution containing ultra-pure distilled water, ethylene glycol and a 20 wt % Nafion® ionomer solution (manufactured by Dupont) to prepare a slurry, and the slurry was used to form a cathode catalyst layer on a polymer film. The loading of Pt in the cathode was 2 mg/cm$^2$.

A PtRu black catalyst was used to form an anode catalyst. Similarly to the forming of the cathode catalyst, PtRu black was dispersed in a solution containing ultra-pure distilled water, ethylene glycol and a 20 wt % NAFION ionomer solution to prepare a slurry, and the slurry was used to form the catalyst layer on a polymer film. The loading of PtRu in the anode catalyst layer was 6 mg/cm$^2$. A Nafion® 115 membrane as an electrolyte membrane was interposed between the formed anode catalyst layer and the cathode catalyst layer and the anode catalyst layer and the cathode catalyst later were transferred to the electrolyte membrane. Then, the anode catalyst layer and the cathode catalyst layer were respectively bonded with an anode diffusion layer and a cathode diffusion layer to manufacture a unit cell.

In a unit cell test, the mixture of the 1 M aqueous methanol solution and the 3 wt % aqueous hydrogen peroxide solution described above was used as an anode fuel, and air was used as a cathode fuel. In the unit cell test, changes in current density were measured while maintaining the temperature at 50° C. and the voltage at 0.4 V.

EXAMPLE 2

A fuel cell was manufactured and a unit cell test was performed in the same manner as in Example 1, except that a 5 wt % aqueous hydrogen peroxide solution was used instead of a 3 wt % aqueous hydrogen peroxide solution. Here, the weight ratio of methanol to hydrogen peroxide to ultra-pure distilled water was 3.20:5.00:91.80.

EXAMPLE 3

A fuel cell was manufactured and a unit cell test was performed in the same manner as in Example 1, except that a 10 wt % aqueous hydrogen peroxide solution was used instead of a 3 wt % aqueous hydrogen peroxide solution. Here, the weight ratio of methanol to hydrogen peroxide to ultra-pure distilled water was 3.20:10.00:86.80.

EXAMPLE 4

A fuel cell was manufactured and a unit cell test was performed in the same manner as in Example 1, except that a 1 M ethanol aqueous solution and a 5 wt % aqueous hydrogen peroxide solution were used instead of a 1 M methanol aqueous solution and 3 wt % hydrogen peroxide solution. Here, the weight ratio of ethanol to hydrogen peroxide to ultra-pure distilled water was 4.60:5.00:90.40.

COMPARATIVE EXAMPLE 1

A fuel cell was manufactured and a unit cell test was performed in the same manner as in Example 1, except that a 1 M methanol aqueous solution was used as a fuel instead of a mixture of a 1 M methanol aqueous solution and a 3% by weight of aqueous hydrogen peroxide solution. Here, the weight ratio of methanol to ultra-pure distilled water was 3.20:96.80.

COMPARATIVE EXAMPLE 2

A fuel cell was manufactured and a unit cell test was performed in the same manner as in Example 1, except that a 1 M methanol aqueous solution and a 5 wt % sulfuric acid aqueous solution were used as a fuel instead of a mixture of a 1 M methanol solution and a 3 wt % aqueous hydrogen peroxide solution. Here, the weight ratio of methanol to sulfuric acid to ultra-pure distilled water was 3.20:5.00:91.80.

COMPARATIVE EXAMPLE 3

A fuel cell was manufactured and a unit cell test was performed in the same manner as in Example 1, except that a 1 M ethanol aqueous solution was used as a fuel instead of a mixture of a 1 M methanol aqueous solution and a 3 wt % aqueous hydrogen peroxide solution. Here, the weight ratio of ethanol to ultra-pure distilled water was 4.60:95.40.

For the fuel cells according to Examples 1 through 3 and Comparative Example 1, the current density versus time elapsed was investigated at the constant voltage of 0.4V. The results for Examples 1 and 2 and Comparative Example 1 are shown in FIG. 1. The performance of each fuel cell was measured at 50° C. by supplying the fuel composition indicated in the respective example and dry air.

Referring to FIG. 1, the fuel cells of Examples 1 and 2 had better current density than the fuel cell of Comparative Example 1. Also, although the results for Example 3 are not illustrated in FIG. 1, the fuel cell of Example 3 showed similar results to Examples 1 and 2.

Figure 2:
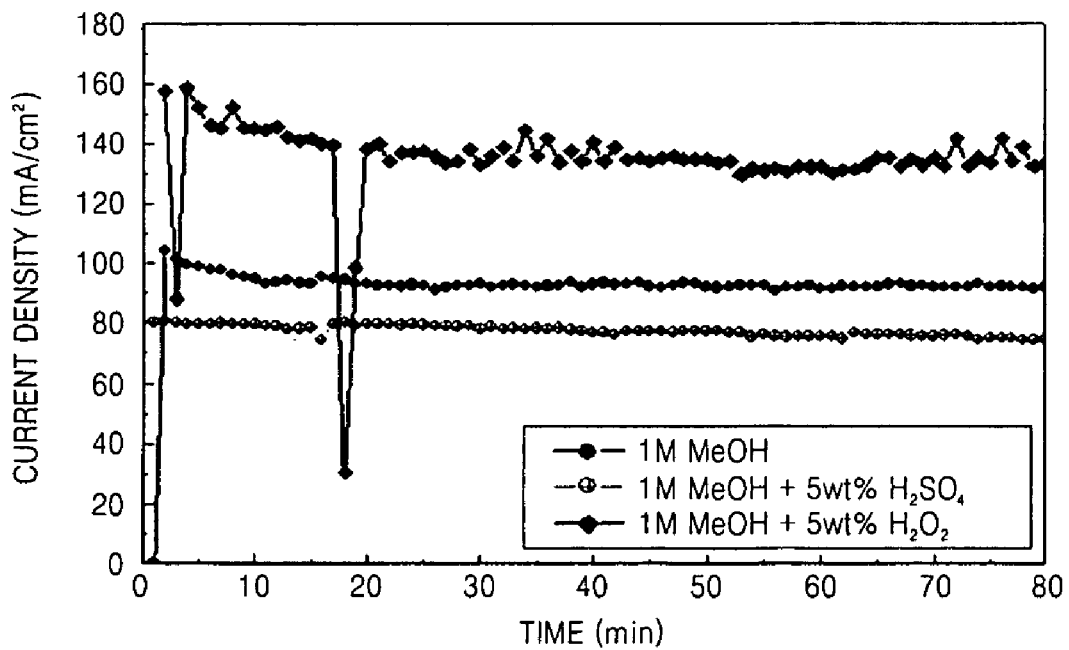
FIG. 2 is a graph of current density versus time for fuel cells manufactured according to Example 2 and Comparative Examples 1 and 2.

For the fuel cells according to Example 2 and Comparative Examples 1 and 2, the current density versus time was investigated at the constant voltage of 0.4V, and the results are shown in FIG. 2. The performance of each fuel cell was measured at 50° C. by supplying the fuel composition indicated in the respective example and dry air.

Referring to FIG. 2, the fuel cell of Examples 2 had a better current density than the fuel cells of Comparative Examples 1 and 2.

In the case of Comparative Example 2, when sulfuric acid, which is a strong acid, was added to the fuel as a proton conductor, portions of the surface of the catalyst were oxidized by the strong acid and thus $SO_4^{2-}$ was formed. $SO_4^{2-}$ blocked active sites of the catalyst, thereby causing a decline in the performance of the fuel cell.

In the fuel cells according to Example 4 and Comparative Example 3, the cell potential versus time was investigated. As a result, it was found that the fuel cell of Example 4 had better performance than the fuel cell of Comparative Example 3.

A fuel composition for a fuel cell according to aspects of the present invention contains at least one primary fuel, which produces protons, and at least one peroxide, thereby increasing catalytic activity. When such a fuel composition is used, a fuel cell having improved performance can be manufactured.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A fuel composition for a fuel cell comprising: at least one primary fuel that produces protons and electrons, wherein the primary fuel is at least one aqueous solution selected from the group consisting of an aqueous solution of a C1-C10 alkyl alcohol and an aqueous solution of a C1-C10 alkyl acid, wherein the concentration of the aqueous solution is 0.01 M to 17 M; and at least one peroxide selected from the group consisting of sodium hydrogen peroxide and a compound represented by Formula 1:

$$M^I{}_2O_2 \qquad \text{[Formula 1]}$$

where $M^I$ is $NH_4$, Rb, or Cs.

2. The fuel composition of claim 1, wherein the peroxide is 0.01 to 99% by weight of the fuel composition.

3. The fuel composition of claim 2, wherein the peroxide is 0.1 to 50% by weight of the fuel composition.

4. The fuel composition of claim 1, wherein the primary fuel comprises at least one fuel selected from the group consisting of methanol, ethanol, and formic acid.

5. A fuel composition for a fuel cell comprising:

at least one primary fuel that produces protons and electrons, wherein the primary fuel is at least one aqueous solution selected from the group consisting of an aqueous solution of a C1-C10 alkyl alcohol and an aqueous solution of a C1-C10 alkyl acid, wherein the concentration of the aqueous solution is 0.01 M to 17 M; and at least one peroxide selected from the group consisting of a compound represented by Formula 1, a compound represented by Formula 2 and sodium hydrogen peroxide:

$$M^I_2O_2 \qquad \text{[Formula 1]}$$

where $M^I$ is H, Li, Na, K, NH$_4$, Rb, or Cs, $$M^{II}O_2 \text{ where } M^{II} \text{ is Mg, Ca, Sr, Ba, Zn, Cd, or Hg,} \qquad \text{[Formula 2]}$$

wherein the amount of peroxide is 3.00 to 10.00 parts by weight based on 100 parts by weight of the fuel composition, and wherein the amount of peroxide is 0.91 to 3.03 mol based on 1 mol of primary fuel.

6. The fuel composition for a fuel cell of claim 5, wherein the primary fuel is methanol, and the peroxide is hydrogen peroxide.

7. A fuel composition for a fuel cell comprising:

at least one primary fuel that produces protons and electrons, wherein the primary fuel is at least one aqueous solution selected from the group consisting of an aqueous solution of a C1-C10 alkyl alcohol and an aqueous solution of a C1-C10 alkyl acid, wherein the concentration of the aqueous solution is 0.01 M to 17 M; and hydrogen peroxide in an amount of 3.00 to 10.00 parts by weight based on 100 parts by weight of the fuel composition, wherein the amount of peroxide is 0.91 to 3.03 mol based on 1 mol of primary fuel.

* * * * *